(12) United States Patent
Brelin (10) Patent No.: US 6,732,282 B1
(45) Date of Patent: May 4, 2004

(54) SYSTEM AND METHOD OF DETERMINING THE POWER RELATIONSHIP AMONG DEVICES

(75) Inventor: Jon Ebbe Brelin, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 553 days.

(21) Appl. No.: 09/693,689

(22) Filed: Oct. 20, 2000

(51) Int. Cl.[7] .............................. G06F 1/26; G06F 1/32
(52) U.S. Cl. ....................... 713/300; 713/320; 713/324; 370/347
(58) Field of Search ............................ 713/300, 320, 713/324, 340; 370/347

(56) References Cited

U.S. PATENT DOCUMENTS

| | | | |
|---|---|---|---|
| 5,652,893 A | * 7/1997 | Ben-Meir et al. | 713/310 |
| 5,751,164 A | * 5/1998 | Sharpe-Geisler et al. | 326/38 |
| 5,919,264 A | * 7/1999 | Reneris | 713/324 |
| 5,959,536 A | * 9/1999 | Chambers et al. | 710/104 |
| 6,092,209 A | * 7/2000 | Holzhammer et al. | 713/324 |
| 6,321,081 B1 | * 11/2001 | Lee | 455/423 |
| 6,389,466 B1 | * 5/2002 | Zondag | 709/221 |
| 6,473,797 B1 | * 10/2002 | Hirasawa | 709/224 |
| 6,513,064 B1 | * 1/2003 | Horiguchi et al. | 709/223 |
| 6,526,516 B1 | * 2/2003 | Ishikawa et al. | 713/340 |
| 6,530,026 B1 | * 3/2003 | Bard | 713/320 |
| 6,539,484 B1 | * 3/2003 | Cruz | 713/300 |
| 6,594,251 B1 | * 7/2003 | Raissinia et al. | 370/347 |

FOREIGN PATENT DOCUMENTS

EP 0406486 A1 * 7/1989

OTHER PUBLICATIONS

Igarashi et al., "Home Network File System for Home Network Based on IEEE–1394 Technology", IEEE Transactions on Consumer Electronics, vol. 45, No. 3, Aug. 1999, pp 1000–1003.*

TA Document 1999025, *AV/C General—Descriptor and Info Block Mechanism*, Draft 0.2:212, Dec. 17, 1999, 1394 Trade Association.

* cited by examiner

*Primary Examiner*—Thomas Lee
*Assistant Examiner*—Chun Cao
(74) *Attorney, Agent, or Firm*—Blakely, Sokoloff, Taylor & Zafman LLP (57) ABSTRACT

A method and apparatus for determining the power type relationships of a unit or a subunit coupled to a high speed bus. In one embodiment, this is accomplished by a first device such as a controller sending a POWER TYPE command to a second device or target device such as a unit or a subunit. A response frame is returned from the second device to the first device indicating the power type relationships that exist.

16 Claims, 8 Drawing Sheets

---

A first device (*e.g.* controller) sends a POWER TYPE command to a unit of a second device.
1100

↓

The second device returns a response frame of the POWER TYPE command to the first device showing all power dependencies on the subunit.
1110

↓

The first device (*e.g.* controller) has access to the power type relationships of the unit and all its subunits.
1120

SYSTEM AND METHOD OF DETERMINING THE POWER RELATIONSHIP AMONG DEVICES

BACKGROUND OF THE INVENTION

FIELD OF THE INVENTION

The invention relates to determining a power dependencies or relationships of a device connected to interconnected systems such as audio, video, or audio/video systems.

BACKGROUND

Determining the power type relationship of a unit or a subunit connected to a high speed serial bus such as an Institute of Electrical and Electronics Engineers (IEEE) 1394 standard serial bus, std 1394–1995, Standard For A High Performance Serial Bus, (Aug. 30, 1996) (hereinafter referred to as the "IEEE 1394 standard serial bus") is complex because of the many relationships that may exist between units and subunits or between subunits and other subunits. A power type relationship involves a single unit enclosing one or more subunits, and their corresponding power dependencies in which any single subunit may be powered on or off independently or dependently with the unit or other subunits in the unit.

One illustration of the problems associated with the conventional system relates to the IEEE 1394 standard serial bus that uses three general rules that are designed into an AV/C controller ("controller"). One rule is if a unit's power is activated, then the power to the subunit is activated. Another rule is that if a unit is deactivated, all the subunits of the unit are deactivated. Yet another rule is that if a subunit's power is turned on or off, there is no effect on the unit or other subunits. These general rules do not support more complex situations. For example, whether a subunit is activated may depend upon whether other subunits in the unit are activated. In another situation, the power to a subunit may be completely independent of the unit or the subunit but depend upon whether a third subunit is activated. Given that the conventional system is unable to determine whether a unit is activated or deactivated in complex power type relationships, it is desirable to have a system and a method that is able to address complex rules associated with subunits and units.

SUMMARY

The invention relates to determining the power type relationship that a unit has with its subunits, and a subunit has with its unit and other subunits within the unit. This is achieved by a first device such as a controller sending a POWER TYPE command to a second device or target device such as a unit or a subunit. A response frame, which is a part of the POWER TYPE command, is returned to the first device from the second device. The response frame provides the power type relationships that exist in the target device. Additional features, embodiments, and benefits will be evident in view of the figures and detailed description presented herein.

BRIEF DESCRIPTION OF THE DRAWINGS

The present invention is illustrated by way of example and not limited in the figures of the accompanying drawings, in which like references indicate similar elements and in which.

DETAILED DESCRIPTION

The invention concerns determining power dependencies or relationships of a unit relative to its subunits, or a subunit relative to its enclosing unit or its subunits. In order to determine these power type relationships, a first command, referred to herein as the POWER TYPE command, is sent from a first device such as a controller on a high speed bus such as an IEEE 1394 standard serial bus to a second device such as a unit or a subunit. After executing the POWER TYPE command, the second device returns a response frame to the first device. The response frame includes the unit/subunit power type relationships that the second device may have. This provides the controller access to complex power type relationship information so that it may properly power the device.

In the following description, numerous specific details are set forth to provide a thorough understanding of the invention. However, it will be understood by one of ordinary skill in the art that the invention may be practiced without these specific details. In other instances, well known structures and techniques have not been shown in detail to avoid obscuring the invention.

Figure 1:
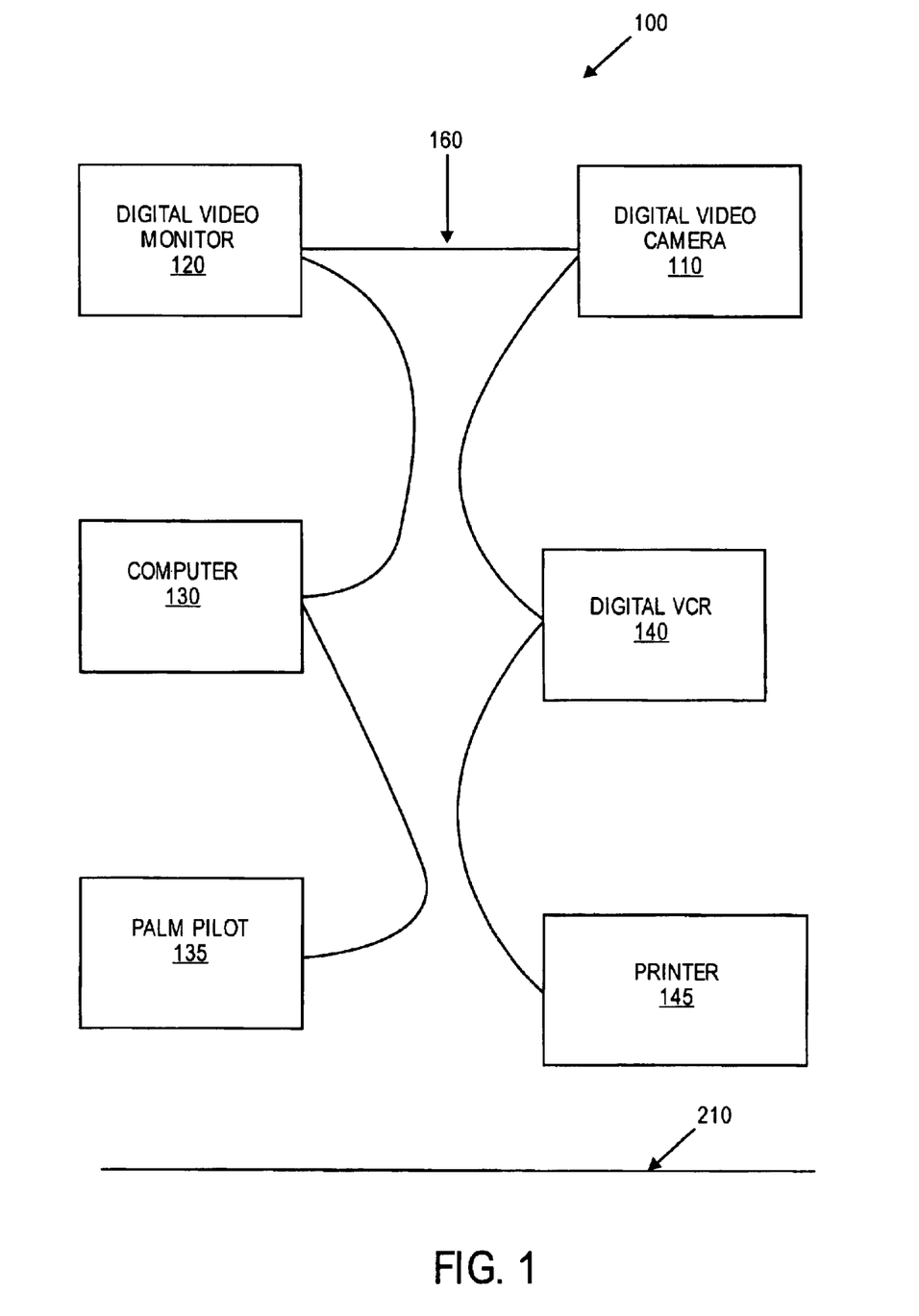
FIG. 1 is a block diagram of one embodiment for a multimedia network.

FIG. 1 is a block diagram of one embodiment for a unit such as multimedia network 100, including various subunits such as consumer electronic devices coupled through a high speed serial bus 160. The high speed serial bus 160 may be, for example, an IEEE 1394 standard serial bus. In one embodiment, the multimedia network 100 may be located in one physical building, such as a home or an office. Multimedia network 100 may include a number of different devices such as digital video camera ("DVC") 110, digital video monitor 120, personal computer 130, personal digital assistant 135, digital video cassette recorder ("VCR") 140, set top box 142, and printer 145. High speed serial bus 160 supports communication of digital audio/video data and computer transmission data between the network devices.

DVC 110, digital VCR 140, printer 145, and other consumer electronic devices typically do not have direct Internet access whereas devices such as computer 130 and personal digital assistant 135 may be configured to have Internet access. Computer 130 and personal digital assistant 135 contain processors which execute instructions stored on a media, such as memory (volatile, non-volatile, removable), storage media, etc. In one embodiment, network 210 that includes networks such as an intranet or a global network such as the Internet, interfaces with computer 130 and personal digital assistant 135 through, for example, a telephone line (not shown) or wireless communication.

Figure 2:
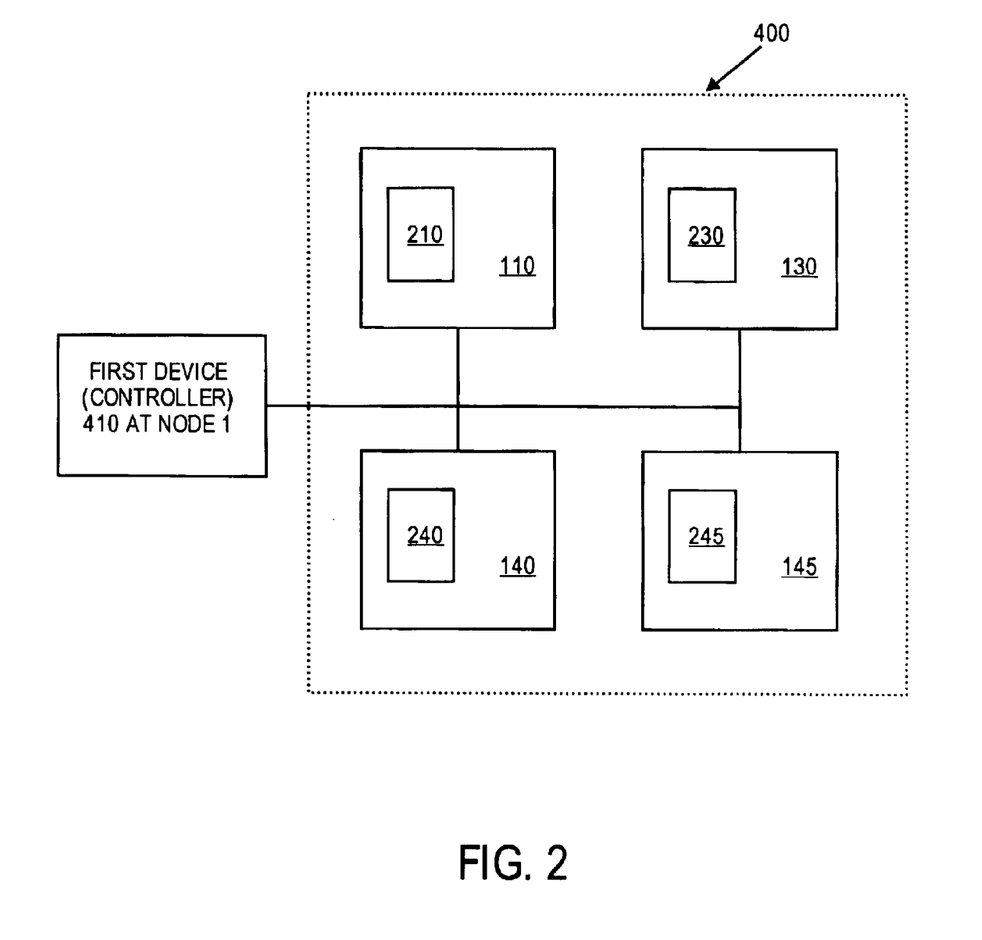
FIG. 2 is a block diagram of one embodiment of two AV/C devices residing in two nodes of a bus.

Given this configuration of a unit such as multimedia network 100, FIG. 2 illustrates one embodiment as to a first device such as a controller determining the power type relationships that a second device such as another unit or a subunit has relative to a third device such as other units or subunits. Specifically, FIG. 2 is a block diagram of one embodiment of four AV/C devices such as computer 130, DVC 110, digital VCR 140, and printer 145 shown in FIG. 1 residing in four nodes of the IEEE 1394 standard serial bus. System 400 includes controller (also referred to herein as a first device) 410 connected to a plurality of subunits or target devices such as DVC 110, computer 130, digital VCR 140, and printer 145.

Although units such as target devices DVC 110, computer 130, digital VCR 140, and printer 145 are shown to include one subunit (210, 230, 240, and 245), it will be appreciated that each of these units may include a plurality of subunits. To illustrate, a unit such as DVC 110 has subunit 210 that includes the power type relationships of DVC 110 relative to its subunits such as its internal tuner subunit, or second tape subunit. These subunits provide various functionalities. For example, the internal tuner subunit is used to receive signals. The second tape subunit may be used for dubbing information from a first tape. The second tape may also be an alternative playback tape. To access the power type relationship from a unit such as DVC 110, controller 410 sends a POWER TYPE command to DVC 110. DVC 110 receives and executes the POWER TYPE command. DVC 110 determines the power relationships with its subunits, and returns a response frame to the controller indicating those relationships. One example of the power type relationship information may indicate that the power to DVC 110 is activated or turned on when its subunit such as its tuner is activated or turned on. Another example of a power type relationship that may exist for DVC 110 is that its subunits opposed one another. In this power type relationship, the power to one of DVC 110's subunits may be turned on to one subunit. Then the power to another subunit is automatically turned off.

The POWER TYPE command, which includes this power type information in the response frame, is returned to controller 410. Controller 410 now has access to the power type relationships that exist in DVC 110. Once controller 410 has determined the power type relationships that exist between the various subunits, controller 410 is generally able to determine whether one subunit is activated or deactivated based upon the power type relationship with another subunit and whether the other subunit is activated or deactivated.

In order to implement these techniques, various features of the POWER TYPE command are presented below. A portion of the POWER TYPE command is as follows:

| | bytes | msb | | | | | | lsb |
|---|---|---|---|---|---|---|---|---|
| opcode | 1 | POWER TYPE | | | | | | |

In one embodiment, the POWER TYPE command includes the opcode, the bytes of the command, the most significant bits ("msb"), and the least significant bits ("lsb") of the command. The opcode is used to instruct the target how to read the operands. It is appreciated that whether this command is issued to a unit or subunit is dependent upon the subunit type and ID fields prior to the opcode.

Shown below is a response frame which is part of the POWER TYPE command frame that was directed to a subunit, and that may be used for determining the power type relationships of that single subunit. As noted, the POWER TYPE provided indicates that the subunit is returning a POWER TYPE response to the controller. Additionally, the subunit power information provides the power type relationships that exist with other subunits and its unit

| | bytes | msb | | | | | | lsb |
|---|---|---|---|---|---|---|---|---|
| opcode | 1 | POWER TYPE | | | | | | |
| operand[1] | | | | | | | | |
| : | n | subunit power information... | | | | | | |
| operand[n] | | | | | | | | |

Another response frame that may be part of the POWER TYPE command that is directed to a unit is provided below. This response frame is different from the previous response frame in that additional information is provided for numerous subunits. For instance, the information that is included for each subunit involves the number of subunits (i.e., number_of_subunits), the type of subunit (i.e., subunit_type[1] such as a device that provides visual images like a camera), and the identification of the subunit (i.e., subunit_ID such as DVC 110, etc.).

| | bytes | msb | | | | | | lsb |
|---|---|---|---|---|---|---|---|---|
| opcode | 1 | POWER TYPE | | | | | | |
| operand[1] | | number_of_subunits = m | | | | | | |
| operand[2] | | subunit_type [1] | | | | subunit_ID [1] | | |
| operand[3] : : | n | subunit power information [1]... | | | | | | |
| : | : | : | | | | | | |
| : | 1 | subunit_type [m] | | | | subunit_ID [m] | | |
| : : : | n | subunit power information [m]... | | | | | | |

The response frame may be further parsed into the subunit power information fields. The subunit power information fields is as follows:

| | bytes | msb | | | | | lsb |
|---|---|---|---|---|---|---|---|
| operand[1] | 1 | unit_dependencies | | | subunit_dependencies | | |
| operand[2] | 1 | number_of_dependent_subunits | | | | | |
| operand[3] | 1 | dependent_subunit_type [1] | | | dependent_subunit_ID [1] | | |
| : | : | : | | | | | |
| : | 1 | dependent_subunit_type [1] | | | dependent_subunit_ID [1] | | |
| : | 1 | number_of_opposing_subunits | | | | | |
| : | 1 | opposing_subunit_type [1] | | | opposing_subunit_ID [1] | | |
| : | : | : | | | | | |
| operand[n] | 1 | opposing_subunit_type [n] | | | opposing_subunit_ID [n] | | |

The subunit power information fields provide a variety of information such as the various power type relationships that may exist between a unit and a subunit and the relationships that may exist between a subunit and other subunits. For example, the subunit power information field includes relationship information such as the number of dependent subunits (i.e., number_of_dependent_subunits), the dependent subunit type (i.e., dependent_subunit_type), the dependent subunit identification (i.e., dependent_subunit_ID), the number of opposing subunits (i.e., number_of_opposing_subunits). The number of dependent subunits represents the number of subunits that the second device such as DVC 110 is dependent upon regarding the power type relationship. The dependent subunit identification uniquely identifies the subunit (e.g., VCR 140) in which DVC is dependent. The dependent subunit type indicates whether the subunit should be on or activated when the target subunit is on. The opposing subunit indicates that if the target subunit is activated, the returned subunit must be deactivated. One example of this relates to a camera. A camera has a video tape recorder (VTR) subunit and a camera subunit. The camera subunit provides the hardware and software to receive and store digital images. There are several known power type relationships that exist between the unit and subunits. For example, one relationship relates to the playback of a video versus recording of a video. To illustrate, when the power to the VTR subunit is turned on, the power to the camera is typically turned off and vice versa. Additionally, if the unit such as the camera is turned off, the VTR subunit and the camera subunit is then turned off. Alternatively, if the camera subunit and the VTR subunit is turned off, the camera is turned off. Since the control has access to the power type relationships, it is unnecessary for the controller to turn off both the VTR subunit and the camera subunit.

In another embodiment, a VCR and a tuner may be placed on separate power modules in which the VCR is placed on one power module and the tuner is placed on another power module. This allows the VCR or the tuner to be powered on separately from the unit. Alternatively, the unit could be powered on causing the VCR and the tuner to be turned on. In order to conserve power, the controller is only required to turn on one subunit since that subunit will turn on the other dependent subunit.

Additionally, the number of opposing subunits and the number of dependent subunits is also provided relative to DVC 110. The number of dependent subunits indicates the number of relationships that must be tracked between various subunits.

The unit_dependencies field indicates the power constraints placed on a device such as subunit by its unit. The subunit_dependencies field indicates the power constraints placed on the subunit relative to other subunits in the unit. In one embodiment, the subunit may have the following values with the corresponding meaning.

| Field value | Meaning |
| --- | --- |
| xxx1 | Subunit power is activated if unit is activated |
| xx1x | Subunit power is deactivated if unit is deactiviated |
| others | reserved |

If the first bit is set, the subunit power is activated or turned on if the unit is activated or turned on. In contrast, if the second bit is set, the subunit power is deactivated if the unit is deactivated.

Another dependencies field may be as follows:

| Field value | Meaning |
| --- | --- |
| xxx1 | Subunit power ON requires unit or other subunits power ON |
| xx1x | Subunit power OFF requires unit or other subunits power OFF |
| x1xx | Subunit power opposite of other subunits |
| others | reserved |

If bit 1 is set, then activating the subunit generally activates other required subunits too, as provided in the dependent_subunit_type and dependent_subunit_ID fields. It will be appreciated that activating the target subunit will require activating or turning on the returned subunit. To determine whether the other subunit has dependencies on this subunit, the POWER TYPE command should be sent to the other subunit. If bit 2 is set, then the same rule applies to turning off the subunit.

If bit 3 is set, then activating the subunit will deactivate other subunits as indicated in the opposing_subunit_type and opposing_subunit_ID fields. The reserved field is typically reserved for some future use.

If none of the bits are set, it is assumed that the targeted subunit is independent of other subunits in the unit. It will be appreciated that the targeted subunit may still have other subunits that depend on this subunit. In this case, the dependent subunits will be activated or deactivated when the target subunit is activated or deactivated.

FIGS. 3–11 illustrate the unit-subunit dependency and independency power type relationships that may exist. As previously stated, the power type relationship between a unit and a subunit, and the power type relationship between a subunit and a subunit are determined by a first device such as a controller sending the POWER TYPE command to a second device such as a unit or a subunit. The POWER TYPE command is executed and the second device provides the power type relationship information (e.g., unit to subunit, subunit to subunit) in the response frame of the POWER TYPE command that is returned to the first device from the second device. Provided below are examples of the power type relationships that may be included in the response frame of the POWER TYPE command.

Figure 3:
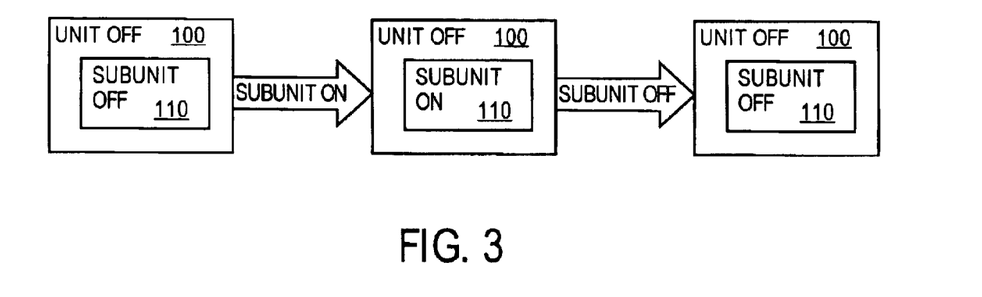
FIG. 3 illustrates a block diagram of one power type relationship between a unit and a subunit.

FIG. 3 illustrates a block diagram of one power type relationship between unit 100 and subunit 110. Unit 100 is turned off and subunit 110 is turned off. Subunit 110 is then activated. Activating subunit 110 has no affect on unit 100 since unit 100 is independent of subunit 110. Subunit 110 is then deactivated or turned off and unit 100 remains off.

Figure 4:
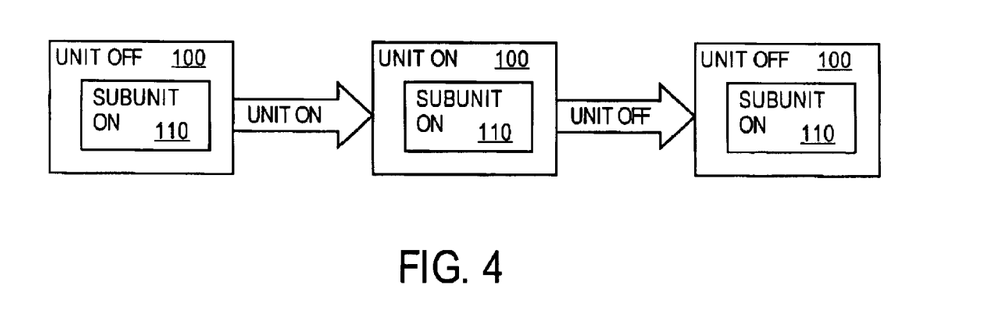
FIG. 4 illustrates a block diagram of one power type relationship between a unit and a subunit.

In accordance with one embodiment, FIG. 4 illustrates a block diagram of one power type relationship between unit 100 and subunit 110. Initially, unit 100 is turned off and subunit 110 is turned on. Unit 100 is then activated or turned on. Unit 100 and subunit 110 remain activated. Unit 100 is then turned off which has no affect on subunit 110. In this relationship, subunit 110 is independent of unit 100.

Figure 5:
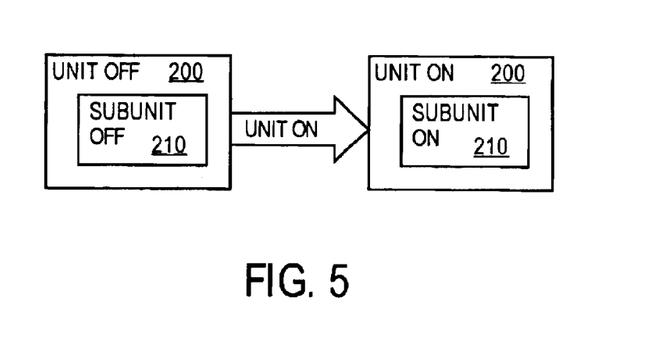
FIG. 5 illustrates a block diagram of one power type relationship between a unit and a subunit.

In one embodiment, FIG. 5 illustrates a block diagram of a power type relationship between unit 200 and subunit 210. In this embodiment, the power to subunit 210 is dependent upon unit 200. Initially, unit 200 is deactivated and subunit 210 is deactivated. When unit 200 is activated or turned on, subunit 210 is also turned on. Accordingly, subunit 210's power on is dependent upon unit 200 power on.

Figure 6:
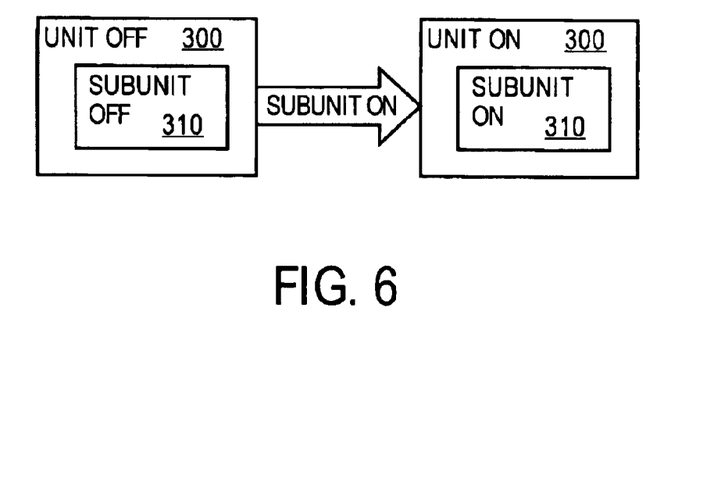
FIG. 6 illustrates a block diagram of one power type relationship between a unit and a subunit.

In one embodiment, FIG. 6 illustrates a block diagram of one power type relationship between unit 300 and subunit 310. Unit 300 is dependent upon subunit 310. In this embodiment, unit 300 is initially turned off and subunit 310 is turned off. Subunit 310 is then activated or turned on causing unit 300 to also be activated or turned on.

Figure 7:
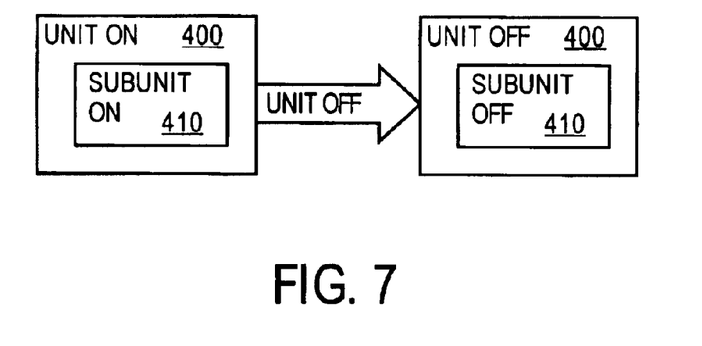
FIG. 7 illustrates a block diagram of one power type relationship between a unit and a subunit.

In one embodiment, FIG. 7 illustrates a block diagram of one power type relationship between unit 400 and subunit 410. The power to subunit 410 is dependent upon unit 400. In this embodiment, unit 400 is initially turned on. Unit 400 is then turned off causing subunit 410 to be turned off. Subunit 410 is dependent upon the power status of unit 400.

Figure 8:
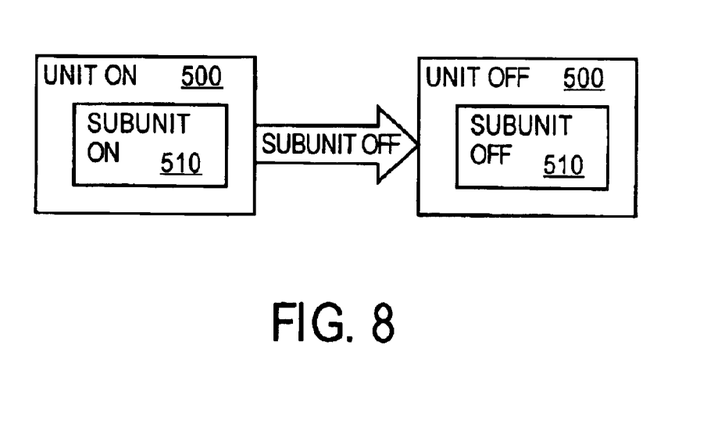
FIG. 8 illustrates a block diagram of one power type relationship between a unit and a subunit.

In one embodiment, FIG. 8 illustrates a block diagram of one power type relationship between unit 500 and subunit 510. Unit 500 is dependent upon subunit 510. In this block diagram, unit 500 and subunit 510 are initially turned on. Unit 500 is turned off which causes unit 500 to also turn off or become deactivated.

Figure 9:
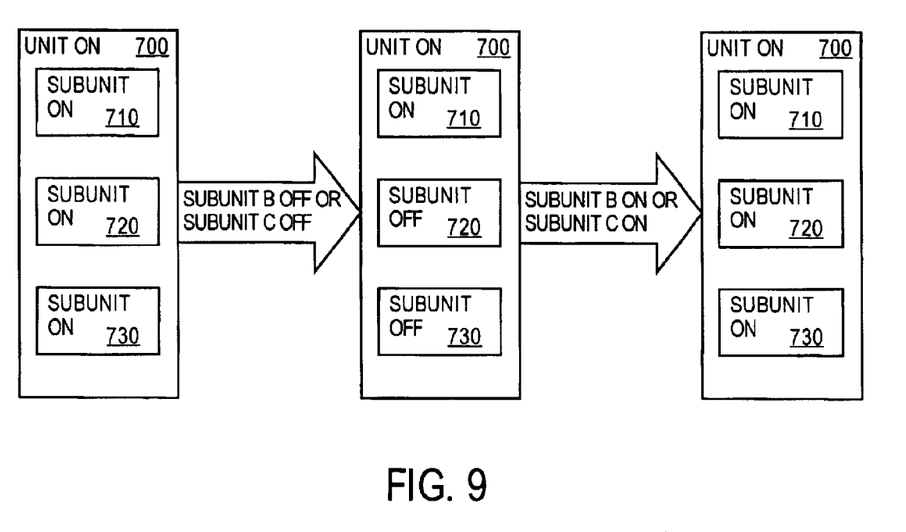
FIG. 9 illustrates a block diagram of one power type relationship between one subunit and another subunit.
Figure 10:
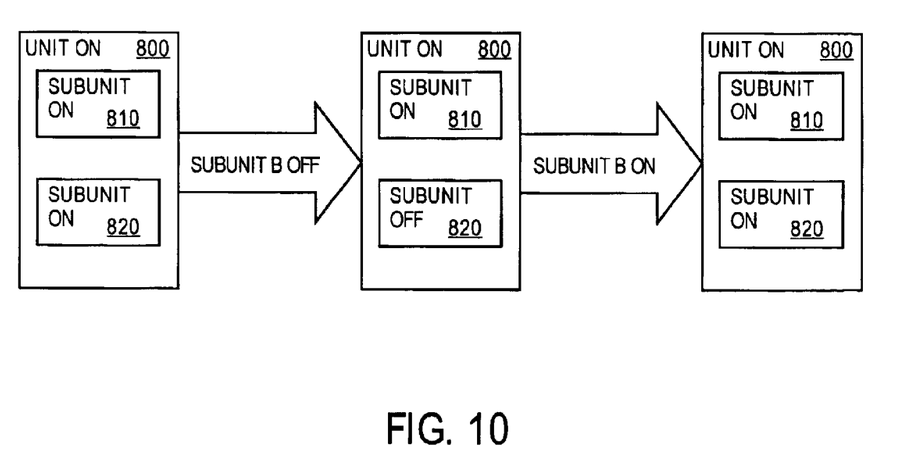
FIG. 10 illustrates a block diagram of one power type relationship between one subunit and another subunit.
Figure 11:
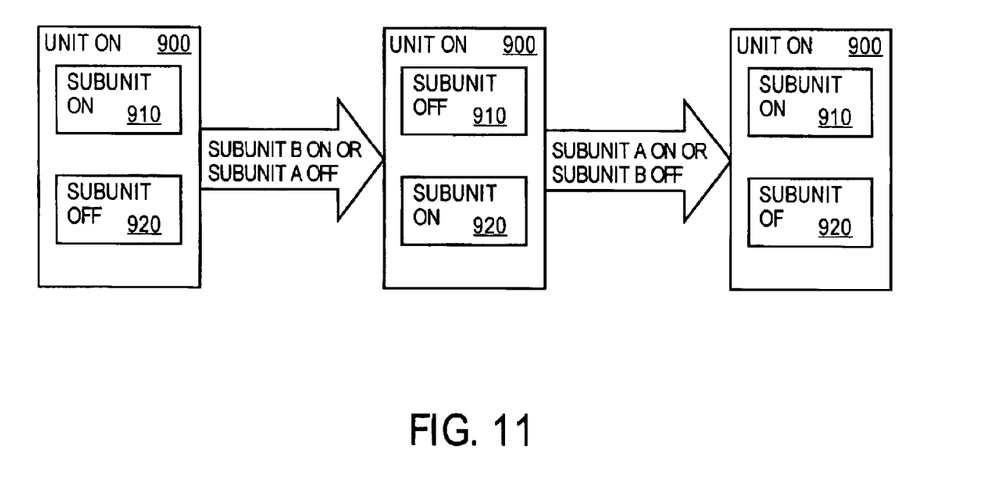
FIG. 11 illustrates a block diagram of one power type relationship between one subunit and another subunit.

FIGS. 9–11 illustrate various subunit to subunit relationships. In one embodiment, FIG. 9 illustrates that unit 700 and subunits 710, 720, and 730 are all activated or turned on. When subunit 720 or subunit 730 are turned off, subunit 710 and unit 700 remain on. Additionally, when subunit 720 or 730 are activated or turned back on, unit 700 and subunit 710 remain on. This illustrates that subunit 710 is independent of subunits 720 and 730.

In one embodiment, FIG. 10 illustrates a block diagram of unit 800 relative to subunits 810 and 820. In this relationship, subunit 810 is independent of subunit 820. For example, FIG. 10 illustrates a block diagram in which unit 800, subunit 810, and subunit 820 are initially activated. Unit 800 is activated or turned on and subunit 810 and 820 are also turned on. When subunit 820 is turned off, unit 800 and subunit 810 remain on. When subunit 820 is then turned on, unit 800 and subunit 810 remain on.

In one embodiment, FIG. 11 illustrates a block diagram of unit 900 relative to subunits 910 and 920. In this embodiment, the power to subunit 910 cannot coexist with subunit 920. Initially, unit 900 and subunit 910 are activated or turned on and subunit 920 is deactivated. If either subunit 910 is turned off or subunit 920 is activated, then subunit 910 is deactivated and subunit 920 is activated. Unit 900 remains activated. If subunit 910 is then activated or subunit 920 is deactivated, then subunit 910 is activated and subunit 920 is deactivated. Unit 900 remains on or activated.

Figure 12:
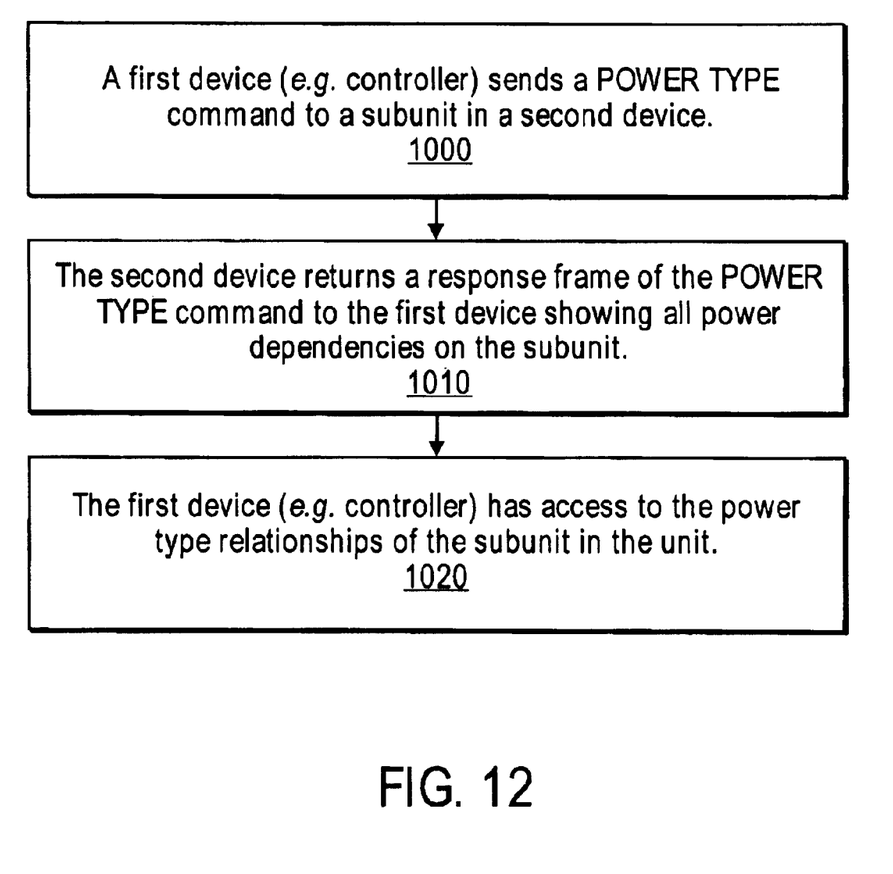
FIG. 12 illustrates a flow diagram of one method in accordance with one embodiment of the invention.

In one embodiment, FIG. 12 illustrates a flow diagram of one method. At block 1000, a first device such as a controller sends a POWER TYPE command to a second device such as a subunit. At block 1010, the second device returns a response frame of the POWER TYPE command to the controller. The response frame indicates the power type relationship between the subunit and its unit or a subunit and other subunits. For example, the unit may have a power type relationship with a subunit in which the unit operates independently of the subunit. If the controller sent the POWER TYPE command to, for example, a subunit, the subunit typically returns a response frame indicating its relationship with the unit (e.g., the unit is independent of the subunit). Therefore, whether the subunit is turned on or turned off has no effect on whether the unit is turned on or off. Other power type relationships as described herein may also be used. At block 1020, the first device has access to the power type relationships and is able to power the unit on and off.

Figure 13:
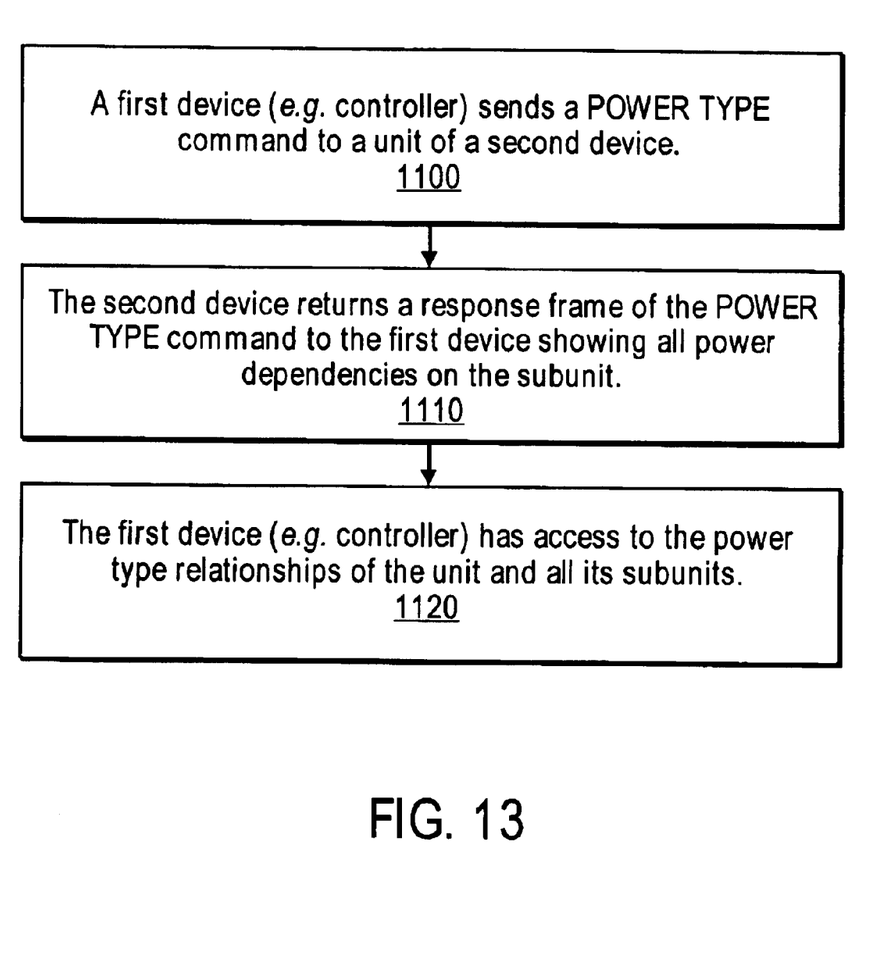
FIG. 13 illustrates a flow diagram of one method in accordance with one embodiment of the invention.

FIG. 13 illustrates a flow diagram of one method in accordance with one embodiment of the invention. At block 1100, a first device (e.g., controller) sends a POWER TYPE command to a unit of a second device. At block 1110, the second device returns a response frame of the POWER TYPE command to the first device showing all power dependencies of the unit. At block 1120, the first device has access to the power type relationships of the unit and its subunits.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:
returning a response frame in response to receiving a first command from a first device, wherein the response frame provides at least one power type relationship between a second device and a third device and includes one of a number of subunits, a subunit type, a subunit identification, and subunit power information.

2. The method of claim 1, wherein the second device has a power type relationship that is dependent upon the third device, wherein the third device is one of a unit and a subunit.

3. The method of claim 1, wherein a power type relationship of the second device is independent of the third device, the third device is one of a unit and a subunit.

4. The method of claim 1, wherein the third device has a power type relationship that depends upon the second device.

5. The method of claim 1, wherein a power type relationship of the third device is independent of the second device.

6. A system comprising:
a bus;
a first device coupled to the bus to send a first command through the bus; and
a second device coupled to the bus to receive the first command through the bus and to send a response frame to the first device through the bus, wherein the response frame provides a power type relationship between the second device and a third device, and includes a number of subunits, a subunit type, a subunit identification, and subunit power information.

7. The system as set forth in claim 6, wherein the first command comprises a POWER TYPE command.

8. The system of claim 6, wherein the second device has a power type relationship that is dependent upon the third device, wherein the third device is one of a unit and a subunit.

9. The system of claim 6, wherein a power type relationship of the second device is independent of the third device, the third device is one of a unit and a subunit.

10. The system of claim 6, wherein the third device has a power type relationship that depends upon the second device.

11. The system of claim 6, wherein a power type relationship of the third device is independent of the second device.

12. A method comprising:
notifying a first device of a response frame to a first command, the response frame providing a power type relationship between at least one of a first unit and a first subunit with one of a second unit and a second subunit, wherein the power type relationship is one of power dependency and power independency and the response frame includes a number of subunits, a subunit type, a subunit identification, and subunit power information.

13. The method of claim 12, wherein one of the first unit and the first subunit has a power type relationship that is dependent upon one of the second unit and the second subunit.

14. The method of claim 12, wherein a power type relationship of one of the first unit and the first subunit is independent of one of the second unit and the second subunit.

15. The method of claim 12, wherein one of the second unit and the second subunit has a power type relationship that depends upon one of the first unit and the first subunit.

16. The method of claim 12, wherein a power type relationship of one of the second unit and the second subunit is independent of one of the first unit and the second subunit.

* * * * *